(12) United States Patent
Mehra

(10) Patent No.: US 11,721,321 B2
(45) Date of Patent: *Aug. 8, 2023

(54) SYSTEMS AND METHODS FOR IDENTIFYING CONTENT CORRESPONDING TO A LANGUAGE SPOKEN IN A HOUSEHOLD

(71) Applicant: Rovi Guides, Inc., San Jose, CA (US)

(72) Inventor: Shuchita Mehra, Phoenixville, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,356

(22) Filed: Aug. 23, 2021

(65) Prior Publication Data

US 2021/0383792 A1 Dec. 9, 2021

Related U.S. Application Data

(63) Continuation of application No. 16/810,279, filed on Mar. 5, 2020, now Pat. No. 11,127,393, which is a
(Continued)

(51) Int. Cl.
*G06F 40/58* (2020.01)
*G10L 15/00* (2013.01)
(Continued)

(52) U.S. Cl.
CPC .......... *G10L 15/005* (2013.01); *G06F 16/243* (2019.01); *G06F 16/685* (2019.01);
(Continued)

(58) Field of Classification Search
CPC ... G10L 15/005; G06F 16/243; G06F 16/685; G06F 40/58; H04N 21/44213; H04N 21/4856
(Continued)

(56) References Cited

U.S. PATENT DOCUMENTS 6,388,714 B1 5/2002 Schein et al.
7,051,360 B1 5/2006 Ellis et al.
(Continued)

FOREIGN PATENT DOCUMENTS

EP 1158799 A1 11/2001
JP 2000013510 A 1/2000
(Continued)

OTHER PUBLICATIONS

A. Lavie, F. Pianesi and L. Levin, "The NESPOLE! System for multilingual soeech communication over the Internet," in IEEE Transactions on Audio, Speech, and Language Processing, vol. 14, No. 5, pp. 1664-1673, Sep. 2006, doi: 10.1109/TSA.2005.858520. (Year: 2006) (Year: 2006) (Year: 2006).*
(Continued)

*Primary Examiner* — Bharatkumar S Shah
(74) *Attorney, Agent, or Firm* — Haley Guiliano LLP

(57) ABSTRACT

Systems and methods for identifying content corresponding to a language are provided. Language spoken by a first user based on verbal input received from the first user is automatically determined with voice recognition circuitry. A database of content sources is cross-referenced to identify a content source associated with a language field value that corresponds to the determined language spoken by the first user. The language field in the database identifies the language that the associated content source transmits content to a plurality of users. A representation of the identified content source is generated for display to the first user.

20 Claims, 5 Drawing Sheets

Related U.S. Application Data continuation of application No. 16/177,012, filed on Oct. 31, 2018, now Pat. No. 10,621,970, which is a continuation of application No. 14/804,529, filed on Jul. 21, 2015, now Pat. No. 10,134,386.

(51) Int. Cl.

| | | |
|---|---|---|
| *G06F 16/242* | (2019.01) | |
| *G06F 16/683* | (2019.01) | |
| *H04N 21/442* | (2011.01) | |
| *H04N 21/485* | (2011.01) | |

(52) U.S. Cl.
CPC ....... *G06F 40/58* (2020.01); *H04N 21/44213* (2013.01); *H04N 21/4856* (2013.01)

(58) Field of Classification Search
USPC .......................................................... 704/8
See application file for complete search history.

(56) References Cited

U.S. PATENT DOCUMENTS

| | | | |
|---|---|---|---|
| 8,521,531 B1* | 8/2013 | Kim ................... | G06F 16/7844 704/275 |
| 8,630,860 B1 | 1/2014 | Zhang et al. | |
| 8,738,377 B2 | 5/2014 | Byrne et al. | |
| 2010/0153885 A1 | 6/2010 | Yates | |
| 2011/0164175 A1 | 7/2011 | Chung et al. | |
| 2013/0066464 A1* | 3/2013 | Maskatia ............... | G06Q 30/06 700/237 |
| 2013/0173267 A1* | 7/2013 | Washio ................ | G10L 15/197 704/240 |
| 2013/0268970 A1* | 10/2013 | Ellis ................... | H04N 21/4856 725/47 |
| 2015/0095018 A1* | 4/2015 | Fructuoso ............ | G10L 15/063 704/9 |
| 2017/0017642 A1 | 1/2017 | Cunningham et al. | |

FOREIGN PATENT DOCUMENTS

| | | |
|---|---|---|
| JP | 2001296882 A | 10/2001 |
| JP | 2004511867 A | 4/2004 |
| JP | 2006222620 A | 8/2006 |
| JP | 2007201912 A | 8/2007 |
| JP | 2008513840 A | 5/2008 |
| JP | 2008245038 A | 10/2008 |
| JP | 2014006656 A | 1/2014 |
| JP | 2015106827 A | 6/2015 |
| WO | 0231814 A1 | 4/2002 |
| WO | 2014039784 A1 | 3/2014 |
| WO | 2016011016 A1 | 1/2016 |

OTHER PUBLICATIONS

Narayanan and P. G. Georgiou, "Behavioral Signal Processing: Deriving Human Behavioral Informatics From Speech and Language," in Proceedings of the IEEE, vol. 101, No. 5, pp. 1203-1233, May 2013, doi: 10.1109/JPROC.2012.2236291. (Year: 2013 ) (Year: 2013) (Year: 2013).*
Cerekovic et al., "Towards an Embodied Conversational Agent Talking in Croatian," 2007 9th International Conference on Telecommunications, 2007, pp. 41-48, doi: 10.1109/CONTEL.2007. 381848. (Year: 2007) (Year: 2007).*
A. Lavie, "The NESPOLEI System for multilingual speech communication over the Internet", A. Lavie, F. Pianesi and L. Levin, "The NESPOLEI System for multilingual speech communication over the Internet," in IEEE Transactions on Audio, Speech, and Language Processing, vol. 14, No. 5, pp. 1664-1673, Sep. 2006, Sep. 2006, 10.
Cerekovic A., et al., Towards an Embodied Conversational Agent Talking in Croatian, 2007 9th International Conference on Telecommunications, 2007, pp. 41-48, doi: 10.1109/CONTEL.2007. 381848. (Year: 2007).
Rabiner, Rabiner, "Toward Vision 2001: Voice and Audio Processing Considerations," AT&T Technical Journal, American Telephone and Telegraph Co., vol. 74, No. 2, pp. 4-13 (1995).
Rabiner, R Lawrence, "Toward Vision 2001: Voice and Audio Processing Considerations", Rabiner, "Toward Vision 2001: Voice and Audio Processing Considerations," AT&T Technical Journal, American Telephone and Telegraph Co., vol. 74, No. 2, pp. 4-13 (1995), 1995, 4-13.
S. Narayanan, "Behavioral Signal Processing: Deriving Human Behavioral Informatics From Speech and Language", S. Narayanan and P. G. Georgiou, "Behavioral Signal Processing: Deriving Human Behavioral Informatics From Speech and Language," in Proceedings of the IEEE, vol. 101, No. 5, pp. 1203-1233, May 2013, May 2013, 56.

\* cited by examiner

SYSTEMS AND METHODS FOR IDENTIFYING CONTENT CORRESPONDING TO A LANGUAGE SPOKEN IN A HOUSEHOLD

CROSS-REFERENCE TO RELATED APPLICATION

This application is a continuation of U.S. patent application Ser. No. 16/810,279, filed Mar. 5, 2020, which is a continuation of U.S. patent application Ser. No. 16/177,012, filed Oct. 31, 2018 now U.S. Pat. No. 10,621,970, which is a continuation of U.S. patent application Ser. No. 14/804,529, filed Jul. 21, 2015, now U.S. Pat. No. 10,134,386, each of which are incorporated herein by reference in their entirety.

BACKGROUND

In conventional systems, users have access to a plethora of media content. With so much content available, users often require assistance in selecting content, and content providers often require assistance in selecting what content to provide to users. To aid in selecting content, systems allow users to manually specify preferences such as the language of the content they desire. Such systems however fail to seamlessly and automatically derive such preferences, particularly with respect to content language, in identifying what content to recommend to a user.

SUMMARY

Accordingly, methods and systems are disclosed herein for identifying content corresponding to a language spoken in a household. In some embodiments, language spoken by a first user based on verbal input received from the first user is automatically determined with voice recognition circuitry. For example, conversations within a household may be monitored and processed to determine the language of the conversations. In some implementations, duration of the language spoken may be measured and stored.

In some embodiments, a database of content sources is cross-referenced to identify a content source associated with a language field value that corresponds to the determined language spoken by the first user. The language field in the database identifies the language that the associated content source transmits content to a plurality of users.

In some embodiments, a representation of the identified content source is generated for display to the first user. In some implementations, the representation of the identified content source includes an indication of the language field associated with the identified content source. In some implementations, the representation includes a channel name or number of the identified content source. In particular, a media guidance application may present an interactive list of all the languages spoken in the household. A user may select a given one of the languages and in response the media guidance application may present a list of content sources (e.g., channels) that transmit content in the selected language. In some embodiments, the list of content sources and/or the list of languages may be presented in an overlay on top of content currently being generated for display.

In some embodiments, the list of content sources presented to the user that transmit content in the language spoken in the household may be based on the language of the content currently being presented. Specifically, the list of languages spoken in the household that is shown to a user may exclude the language of content currently being presented. For example, a user input is received requesting access to a given content source and a display of content provided by the given content source may be generated. A language field associated with the given content source may be identified and a determination may be made as to whether the language spoken by the first user corresponds to a value of the language field associated with the given content source. A list of languages may be presented to the user that does not correspond to the value of the language field of the given content source. Similarly, the generated display of the representation of the identified content source is provided to a display device if the language spoken by the first user does not correspond to the value of the language field associated with the given content source.

In some embodiments, the language spoken by the first user may be a first language. A second language spoken by a second user based on verbal input received from the second user may be automatically determined where the second user is in the same household as the first user. In some embodiments, the list of languages or content sources may be based on the language that is most frequently spoken in the household. Specifically, based on the verbal input received with the voice recognition circuitry over a threshold period of time, a determination may be made as to whether the second language is spoken more frequently than the first language. If the second language is determined to be spoken more frequently than the first language, the cross-referencing may be performed to identify the content source associated with the language field value that corresponds to the second language instead of the first language.

In some embodiments, an interactive list representing the first and second languages based on the automatic determination of the second language spoken by the second user may be generated for display. Input from a user selecting the second language from the interactive list may be received. The cross-referencing may be performed to identify the content source associated with the language field value that corresponds to the user-selected second language instead of the first language.

In some embodiments, the list of content sources that transmit content in the language spoken in the household may be based on a subscription plan of the household or user. Specifically, a subscription plan associated with the first user may be retrieved from a storage device. A determination may be made as to whether the identified content source, having a language field that corresponds to the language spoken in the household, is included in the retrieved subscription plan prior to generating for display the representation of the identified content source. If the identified content source is not included in the subscription plan, the database of content sources may be cross-referenced to identify a second content source associated with a language field value that corresponds to the determined language spoken by the first user. A representation of the identified second content source may be generated for display.

In some embodiments, the list of content sources that transmit content in a language corresponding to the language spoken by the users in the household may be based on popularity of the content sources. In some implementations, less popular content may be omitted from the display or displayed less prominently (e.g., lower in the list) than more popular sources. In particular, the database of content sources may be cross-referenced to identify a plurality of content sources associated with a respective language field value that corresponds to the determined language spoken by the first user. For each of the plurality of content sources, a popularity value associated with each of the plurality of content source may be identified. Representations of the identified content sources based on the identified popularity values may be generated for display.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
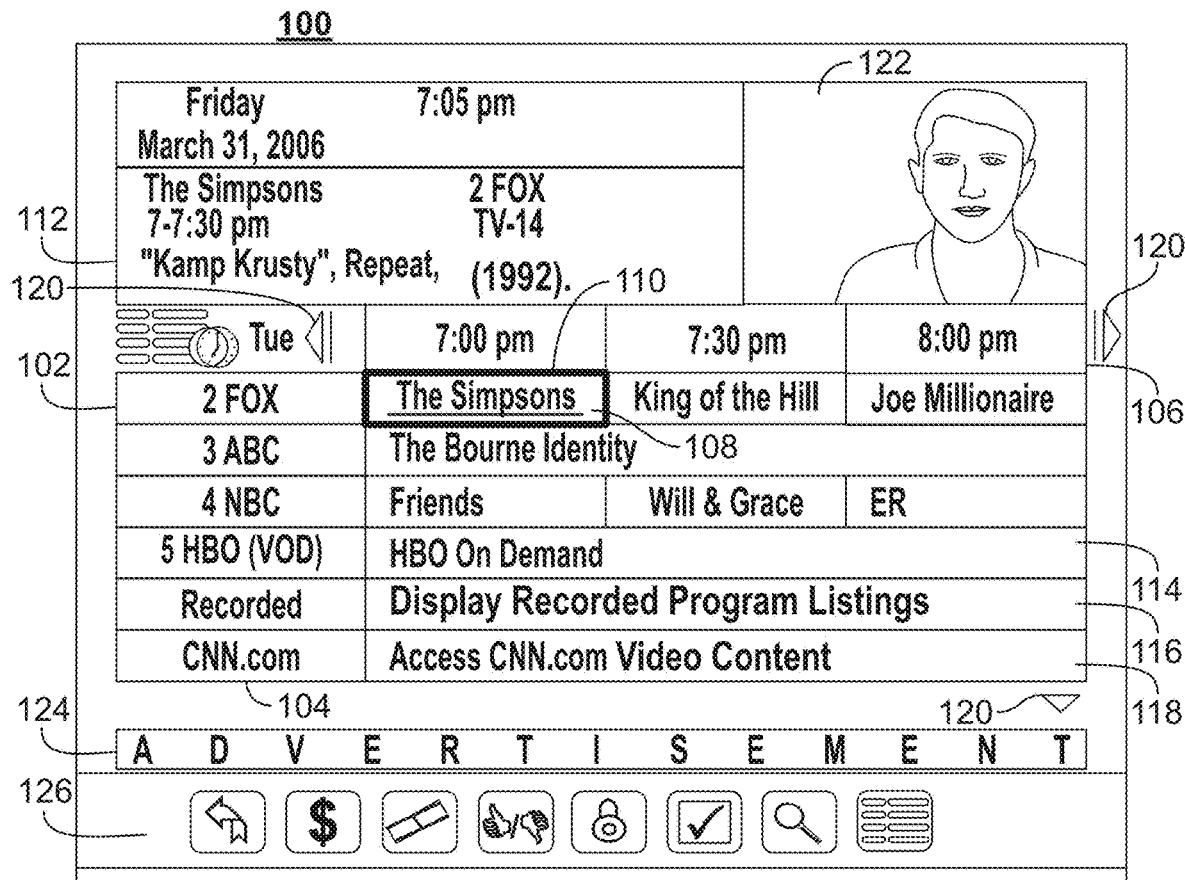
FIGS. 1 and 2 show illustrative display screens that may be used to provide media guidance application listings in accordance with an embodiment of the disclosure.

Methods and systems are disclosed herein for identifying content corresponding to a language spoken in a household. In some embodiments, a media guidance application may monitor verbal input from one or more users in a household. Families or users often have user equipment devices (e.g., set-top boxes) placed throughout the household. A family's or user's household even may include multiple homes. As referred to herein, the term "household" should be understood to mean a home or homes associated with a user.

The media guidance application determines a language corresponding to the verbal input spoken by the one or more users within the household. The media guidance application may cross-reference a database to identify content sources that transmit content to a plurality of users in a language corresponding to the language spoken by the one or more users. The media guidance application may provide a representation of the identified content sources to the user to enable the user to access the content source.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media or medium capable of storing data. The computer-readable media or medium may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, data used for generating a database of content sources and associated language fields, phoneme sequences mapping to languages, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
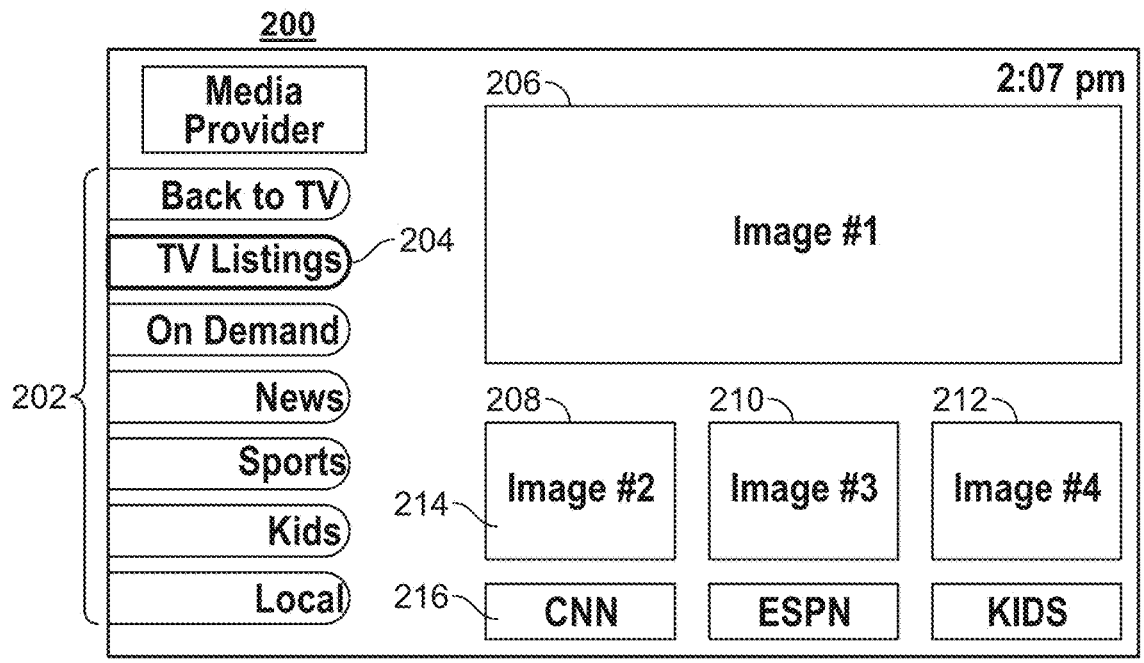

FIGS. 1 and 2 show illustrative display screens that may be used to provide media guidance data. The display screens shown in FIGS. 1-2 and 5-6 may be implemented on any suitable user equipment device or platform. While the displays of FIGS. 1-2 and 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming or subscription plan), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, language spoken in the household, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, or purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to view content corresponding to one or more languages spoken in the household, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Dec. 29, 2005, which is hereby incorporated by reference herein in its entirety.

Figure 3:
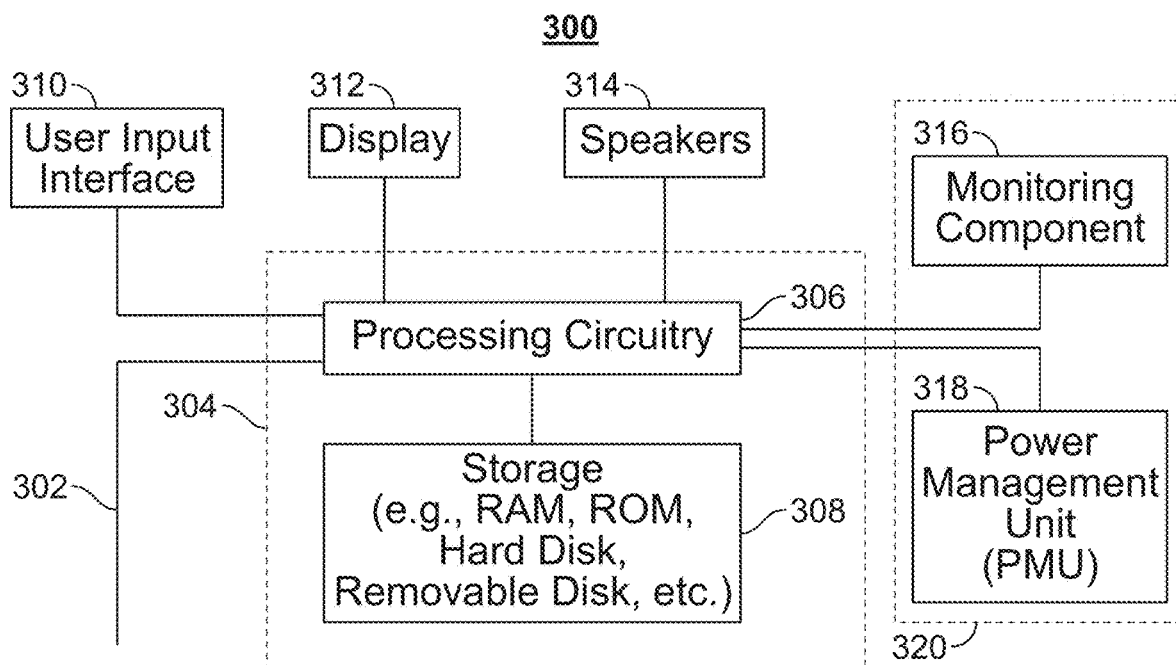
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, language determination, behavioral determination, any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

Using microphones and voice recognition, control circuitry 304 may detect or identify users based on the physical characteristics of their vocal tract through voice recognition, language determination, or voice identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones, it may be possible to generate a spatial areal map. Locations of objects may be determined based on the spatial areal map generated via acoustic localization, IR time of flight, any other suitable mapping method, or any combination thereof. It should be understood that various biometric techniques and devices may be used alone or in combination to supplement each other to more accurately identify or detect users.

In some embodiments, the media guidance application may respond to verbal commands or verbal input received from a user. Control circuitry 304 may include a voice recognition engine or circuitry with a phoneme encoder to process verbal input from a user. In some implementations, the human language sounds (e.g., utterances) may be received with one or more microphones and provided to the phoneme encoder of control circuitry 304. The phoneme encoder may convert the sounds into machine representations of the sounds using a phoneme representation. In one embodiment, the machine representations may be viewed as American Standard Code for Information Interchange (ASCII) representations of the phonemes, or the like, viewable as a sequence of alpha-numeric values. In one embodiment, the machine representations may employ symbols from the International Phonetic Alphabet (IPA) and/or extended sets adapted for use within a computer device.

As used herein, the term "phoneme" refers to a physical representation of a human language sound or utterance. Moreover, a phoneme is a representation of a sound of a language independent of its position in a word or phrase. Thus, phonemes represent sounds in the most neutral form possible. A variety of written representations of phonemes are known in the art, and, as such, virtually any representation may be used by the present disclosure. For example, in one embodiment, the phonemes may be represented by alpha-numeric symbols such as employed in the International Phonetic Alphabet (IPA), American Standard Code for Information Interchange (ASCII) format, or the like. However, as noted, the disclosure is not limited to this mechanism, and others may be used. As used herein, the term "word" refers to a single distinct meaningful element of speech or writing that matches one or more phoneme sequences.

Control circuitry 304 may cross-reference a detected phoneme sequence with a database (not shown) that maps each phoneme sequence to a corresponding language. The process of cross-referencing phoneme sequences with database may be used to determine a language associated with a received plurality of utterances from a user. After the utterances are mapped to their corresponding language, the output may be provided to the media guidance application for further processing. For example, the media guidance application may process the identified language (corresponding to the received utterances) to generate recommendations, generate for display representations of content sources that transmit content to a plurality of users in a language corresponding to the identified language, cross-reference a database of content sources to which the user subscribes to identify a content source associated with a language field corresponding to the identified language, advertisements, perform search queries, load websites, or perform any other command that corresponds to the identified language.

In some embodiments, control circuitry 304 may receive verbal input from the user that includes a plurality of utterances. Each utterance may correspond to a particular word spoken by the user. Typically, the utterances are separated from each other by a brief moment of silence. In response to receiving the utterances, control circuitry 304 may encode the utterances into phoneme sequences. For example, control circuitry 304 may encode each utterance using IPA or some other equivalent digital representation. Control circuitry 304 may store each phoneme sequence using IPA in storage 308. Besides using IPA phonetic encoding, any other type of phonetic encoding or representation system can be used (e.g., SAMPA, X-SAMPA, Arpabet, extIPA, Kirshenbaum, etc.).

Control circuitry 304 may cross-reference the stored IPA for each utterance with the phoneme database to identify the corresponding language. The database may be a local database or remote database. When the database is remote, control circuitry 304 may communicate the phoneme sequence or IPA to a server, which may then return to control circuitry 304 the corresponding language matching the phoneme sequence.

Control circuitry 304 may continuously or periodically monitor verbal input received from the microphone to determine the corresponding language. Control circuitry 304 may measure duration of the verbal input corresponding to a given language. Control circuitry 304 may store in storage 308 a list of all the different languages received over a given interval (e.g., lifetime, several days or months). In addition, control circuitry 304 may indicate for each language a total duration of the verbal input. Accordingly, storage 308 may identify for a given household (e.g., a home of a user) how often one language is spoken relative to another. Namely, a first language stored in storage 308 with a first duration that is larger than a second duration of a second language stored in storage 308 may indicate that the first language is spoken in the household more often than the second language.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store the phoneme database that associates phonemes with languages. The phoneme database may include multiple entries. Each entry may include a phoneme sequence field and a corresponding language field. The phoneme sequence field may identify a set of phonemes that represent a received utterance, and the language field may identify the language that matches the phoneme sequence. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, microphone, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
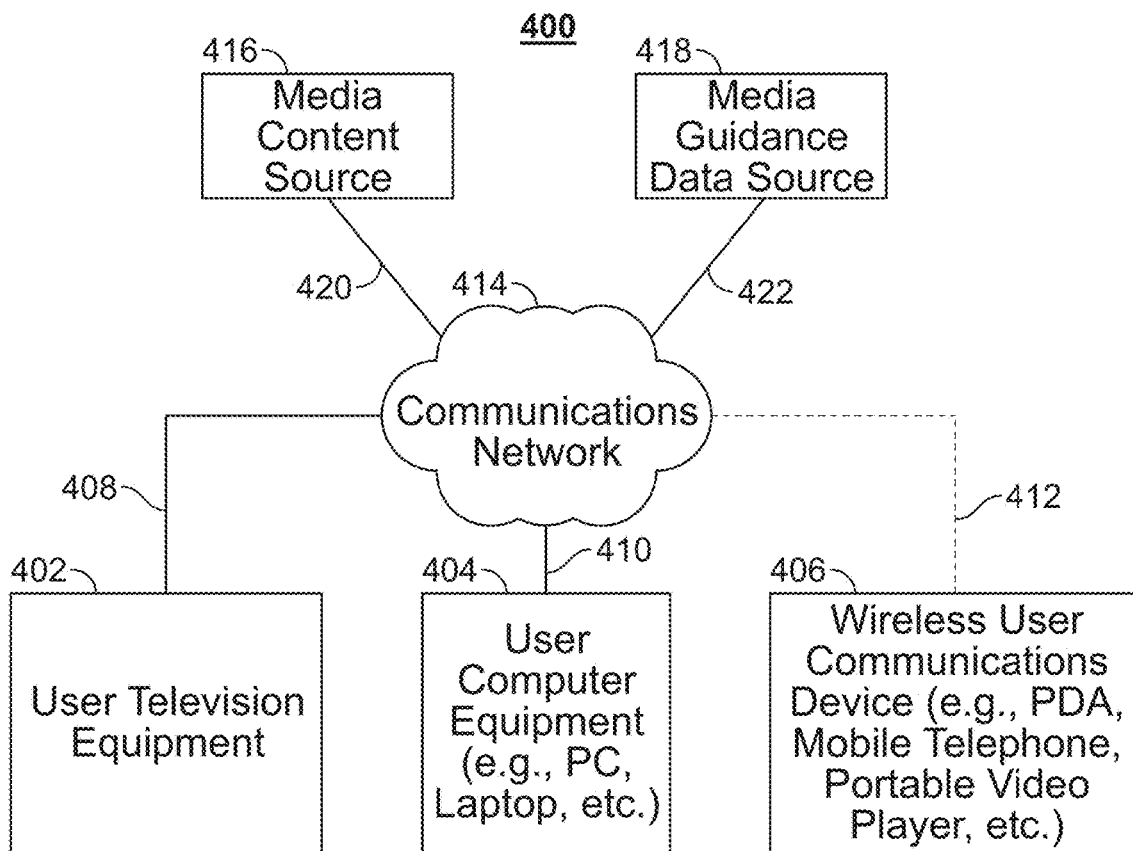
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device (e.g., and may collectively be part of a household) or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, the second screen device may provide verbal input to the first device. In some embodiments, the second screen device may be a thin client that cannot perform voice recognition or ASR but simply sends received utterances from a user to the first device. The first device may include the capability to perform ASR on the utterances received with the second screen device. In such cases, the first device may be a local or remote server. In some embodiments, the second screen device may include full capability to perform ASR on a received utterance and may transmit (if necessary) the corresponding language to the first device for further processing.

The user may also set various settings to maintain consistent media guidance application settings across in-home devices and remote devices. Settings include those described herein, as well as channel and program favorites, programming preferences that the guidance application utilizes to make programming recommendations, display preferences, language, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays and process verbal input.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may process the languages stored in storage 308 to identify content corresponding to the languages. For example, the media guidance application may identify all the languages spoken in the household within a given time frame. The media guidance application may search for content and/or content sources that include content in the language or languages spoken in the household. The media guidance application may present content corresponding to the language spoken in the household based on user selection of a given one of the languages or automatically based on the language that is spoken most frequently in the household.

Figure 5:
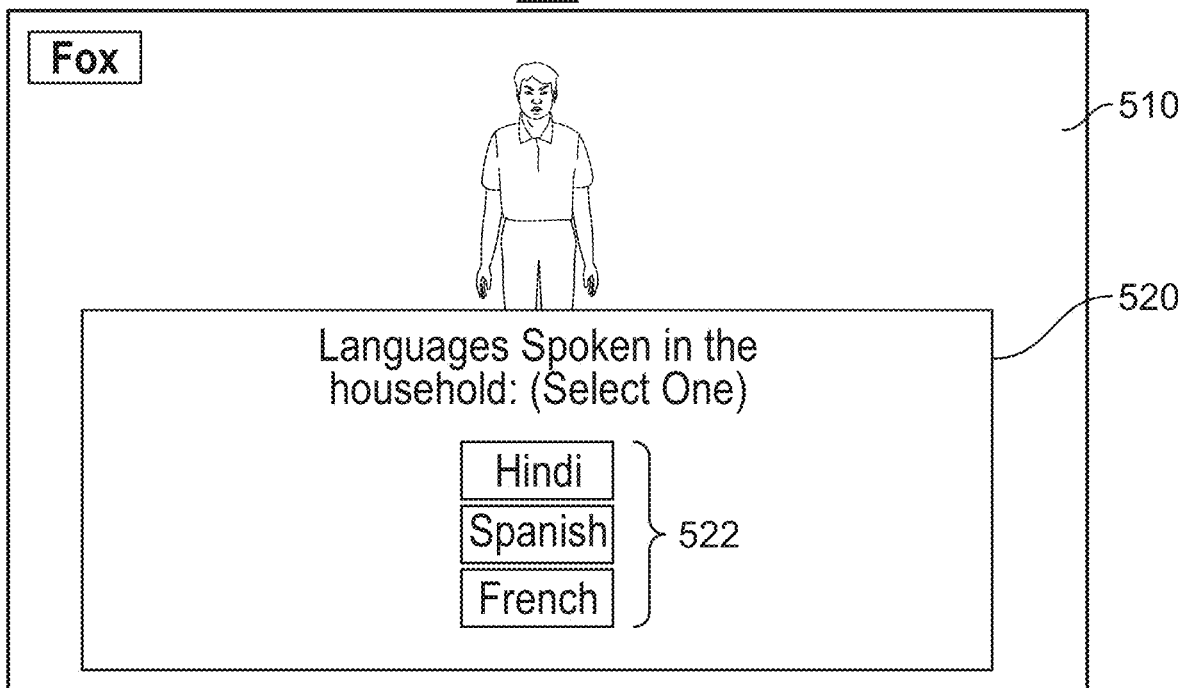
FIGS. 5 and 6 show illustrative display screens that may be used to identify content corresponding to a spoken language in accordance with some embodiments of the disclosure.

FIG. 5 shows an illustrative display screen 500 that may be used to identify content corresponding to a spoken language in accordance with some embodiments of the disclosure. Screen 500 includes a media asset 510 currently being accessed by user equipment 300 and an overlay 520 of spoken languages in the household.

The media guidance application may receive a user request to view a list of languages spoken in the household. In response to the user request, the media guidance application may retrieve from storage 308 a list of languages spoken in the household. The media guidance application may sort the list based on how frequently the language is spoken. Specifically, the media guidance application may sort the list of languages based on the corresponding duration field. As a result, the language that is spoken most frequently or with the greatest duration may be placed at the top of the list. The media guidance application may present the list of languages as an interactive list of languages 522.

For example, the media guidance application may determine that three different languages are spoken over time in the household and, accordingly, display representations in interactive list of languages 522 of all three languages. In some embodiments, the media guidance application may retrieve a language field of media asset 510 currently being presented. For example, the media guidance application may retrieve from the media guidance data associated with media asset 510 an indication that media asset 510 is being received and presented in a first language (e.g., English). The media guidance application may determine whether the first language is included in the list of languages spoken in the household. In response to determining that the first language is included in the list of languages spoken in the household, the media guidance application may exclude the first language from the list of languages presented to the user in overlay 520. This allows the user to select a language that is different from the language of currently received content and that is a language spoken in the household.

The process for determining languages spoken in the household may be performed based on control circuitry 304 processing verbal input from one or more users over time (e.g., lifetime, weeks, months, years, etc.). Control circuitry 304 may process phonemes of the verbal input to identify the corresponding language and duration of the verbal input. Control circuitry 304 may store the language and the duration in the list of languages stored in storage 304. In some implementations, if a given language is already included in the list of languages stored in storage 308, control circuitry 304 may increment the corresponding duration field of the language by the most recently computed duration.

For example, if three languages (e.g., Hindi, Spanish and French) are spoken interchangeably in the household, control circuitry 304 may initially have a language and duration for all three languages. If at some later point in time, verbal input from a user is received and determined to correspond to one of the previously determined languages (e.g., Hindi), control circuitry 304 may compute the duration of the most recent verbal input and increment the duration of the previously stored language by the most recently computed amount. Specifically, the language Hindi may be associated with a duration of 35 minutes. Most recently, control circuitry 304 may determine that verbal input having a duration of five minutes and corresponding to the language Hindi was received. As a result, control circuitry 304 may increment the duration of the language Hindi in storage 308 to 40 minutes.

The media guidance application may receive a user selection of one of the languages in interactive list 522. For example, the user may physically tap a given language displayed in list 522 on the display. The media guidance application may then select the language corresponding to the region where the user has tapped the list. Alternatively, a highlight region or cursor (not shown) may be presented on a given language in list 522. In response to receiving a user command to move the highlight region (e.g., up or down), the media guidance application may navigate the highlight region (or cursor) in the indicated direction to highlight another language (e.g., Hindi) in list 522. When the user selects the OK button (e.g., on a remote control), the media guidance application may receive a user selection of the highlighted language in list 522. In response to receiving a user selection of a given language in list 522, the media guidance application may present a list of content or content sources that correspond to the selected language.

Figure 6:
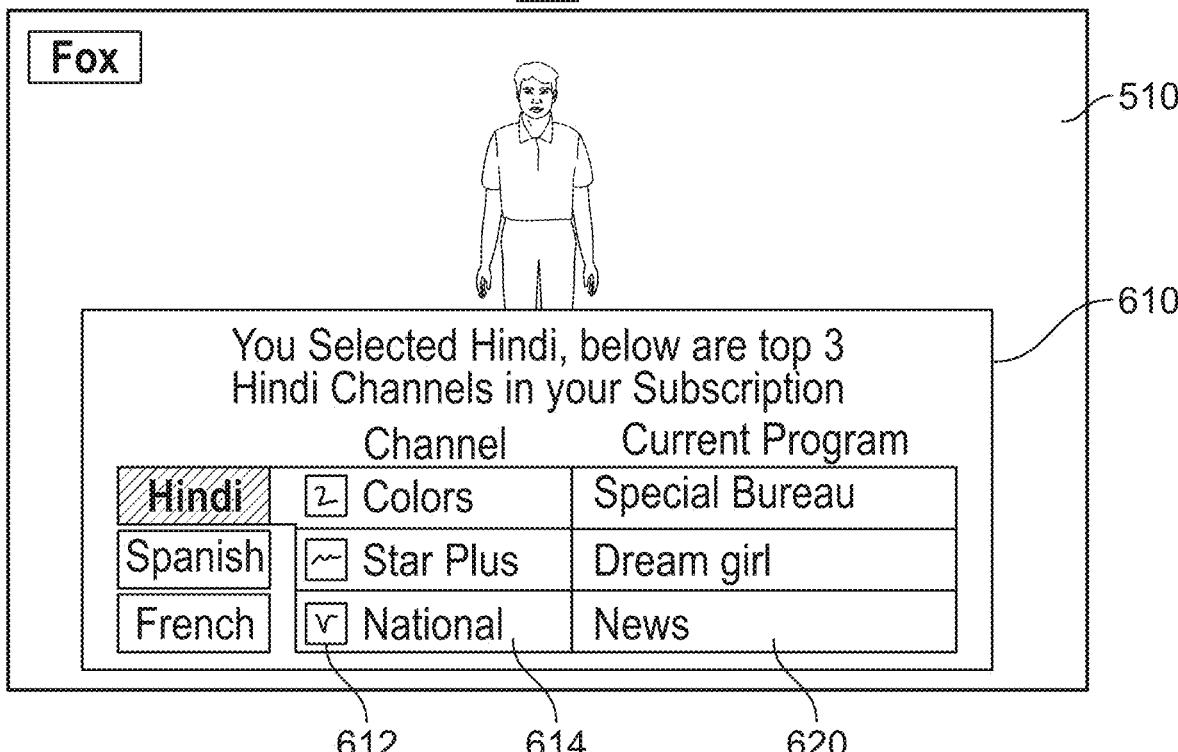

FIG. 6 shows an illustrative display screen 600 that may be used to identify content corresponding to a spoken language in accordance with some embodiments of the disclosure. Screen 600 includes media asset 510 currently being accessed by user equipment 300 and an overlay 610 of content corresponding to a selected one of the spoken languages in the household.

The media guidance application may search language fields in a content source database to identify content sources having a language field that corresponds to the user-selected language. Specifically, the media guidance application may store the language selected by the user in response to receiving the user selection of the language from list 522 (FIG. 5). The media guidance application may cross-reference the stored language selected by the user with the content source database to identify content sources associated with a language field that corresponds to the user selection. For example, the media guidance application may cross-reference the stored language selected by the user with the content source database to identify content sources associated with a language field value that is the same as the user-selected language. The language field for each content source stored in the database may indicate the language of the content provided by the content source. In some embodiments, content sources may provide content over time in multiple languages (e.g., Spanish in the morning and English in the evening). In such circumstances, the language field may include both languages with an indication of when the content is provided in the corresponding language. The media guidance application may use a current time to determine whether the language field associated with the current time for a given content source corresponds to the user-selected language. The media guidance application may generate and store a list of content sources having a language field that corresponds to the user-selected language.

In some embodiments, the media guidance application may retrieve a subscription plan associated with the household or user. The media guidance application may select a portion of the content sources stored in the list based on the subscription plan associated with the household or user. For example, the media guidance application may exclude from the stored content source list any content source that is not also included in the user's or household's subscription plan. Alternatively, the media guidance application may exclude from the stored content source list any content source that is also included in the user's or household's subscription plan. For example, the media guidance application may advertise content sources that have language fields corresponding to the user-selected language and which the user is not subscribed to.

In some embodiments, the media guidance application may retrieve a popularity value associated with each content source that is stored in the list. The media guidance application may select a portion of the content sources stored in the list based on the popularity value associated with each content source. For example, the media guidance application may exclude from the stored content source list any content source that has a popularity value that is less than a predetermined threshold. Alternatively, the media guidance application may exclude from the stored content source list any content source that has a popularity value that exceeds a predetermined threshold. The media guidance application may sort the list of content sources based on popularity values associated with the content sources. For example, content sources associated with a higher popularity value may be placed at the top of the list while content sources associated with a lower popularity value may be placed at the bottom of the list.

Overlay 610 may indicate to the user which language the user-selected (e.g., from screen 500). Overlay 610 may include a content source region and a current program region 620. The content source region may include content source logo 612 and content source name 614. The content source region may be populated by the media guidance application based on the results of cross-referencing or searching the database for content sources having language fields corresponding to the user-selected language. Specifically, the content source region may be populated by the media guidance application using the stored and/or sorted list of content sources. The content sources in the content source region may include an indication of whether the corresponding content source is in the subscription plan associated with the household or user. In some implementations, the indication may include a cost associated with accessing the content source if the content source is not included in the subscription plan associated with the household or user. In some embodiments, the media guidance application may visually distinguish content sources in the content source region that are included in the subscription plan associated with the household or user from content sources in the content source region that are not included in the subscription plan associated with the household or user.

Current program region 620 may include a name of the media asset currently being transmitted to a plurality of users (e.g., broadcast). The content source region and current program region 620 may be interactive to allow a user to select a given content source or program to access the content source or program. The media guidance application may receive a user input (e.g., a selection of a down arrow key). In response, the media guidance application may navigate a cursor from one content source to another (e.g., from the content source "Colors" to the content source "Starplus"). The media guidance application may receive a user selection of the "OK" button to select a given content source highlighted by the cursor. In response, the media guidance application may access the selected content source (e.g., tune to the respective channel) and present the content currently being transmitted by that content source to the user.

In some implementations, the media guidance application may receive a user request or input to navigate the cursor to current program region 620. In response, the media guidance application may navigate the cursor from highlighting a given content source to the corresponding program listing presented in region 620. The media guidance application may receive a user selection of the program listing. In response, the media guidance application may provide additional information about the corresponding media asset. Alternatively, the media guidance application may access the corresponding media asset in response to the user selecting the program listing.

Figure 7A:
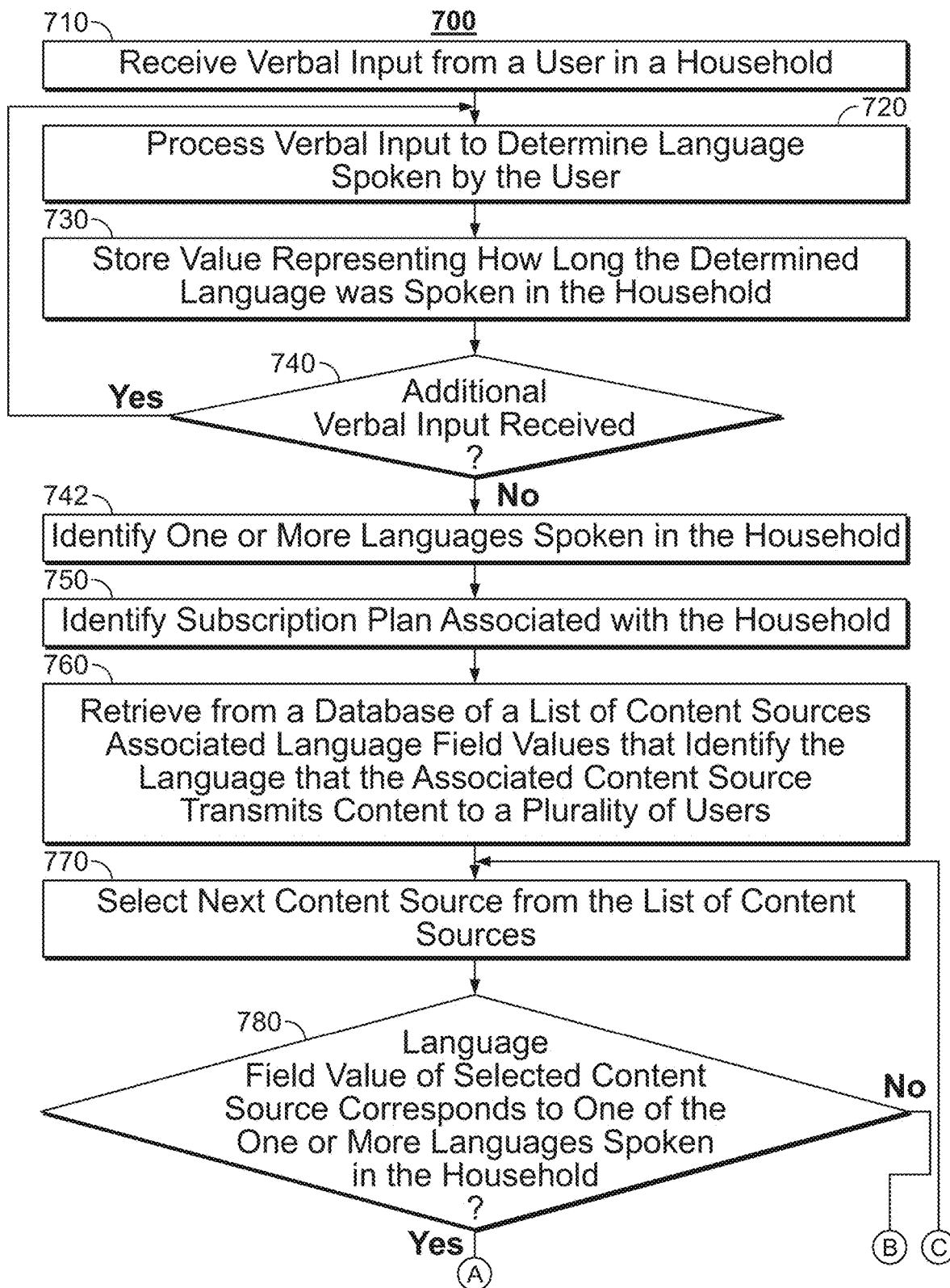
FIG. 7A and FIG. 7B are a flow diagram of an illustrative process for identifying content corresponding to a spoken language in accordance with some embodiments of the disclosure.
Figure 7B:
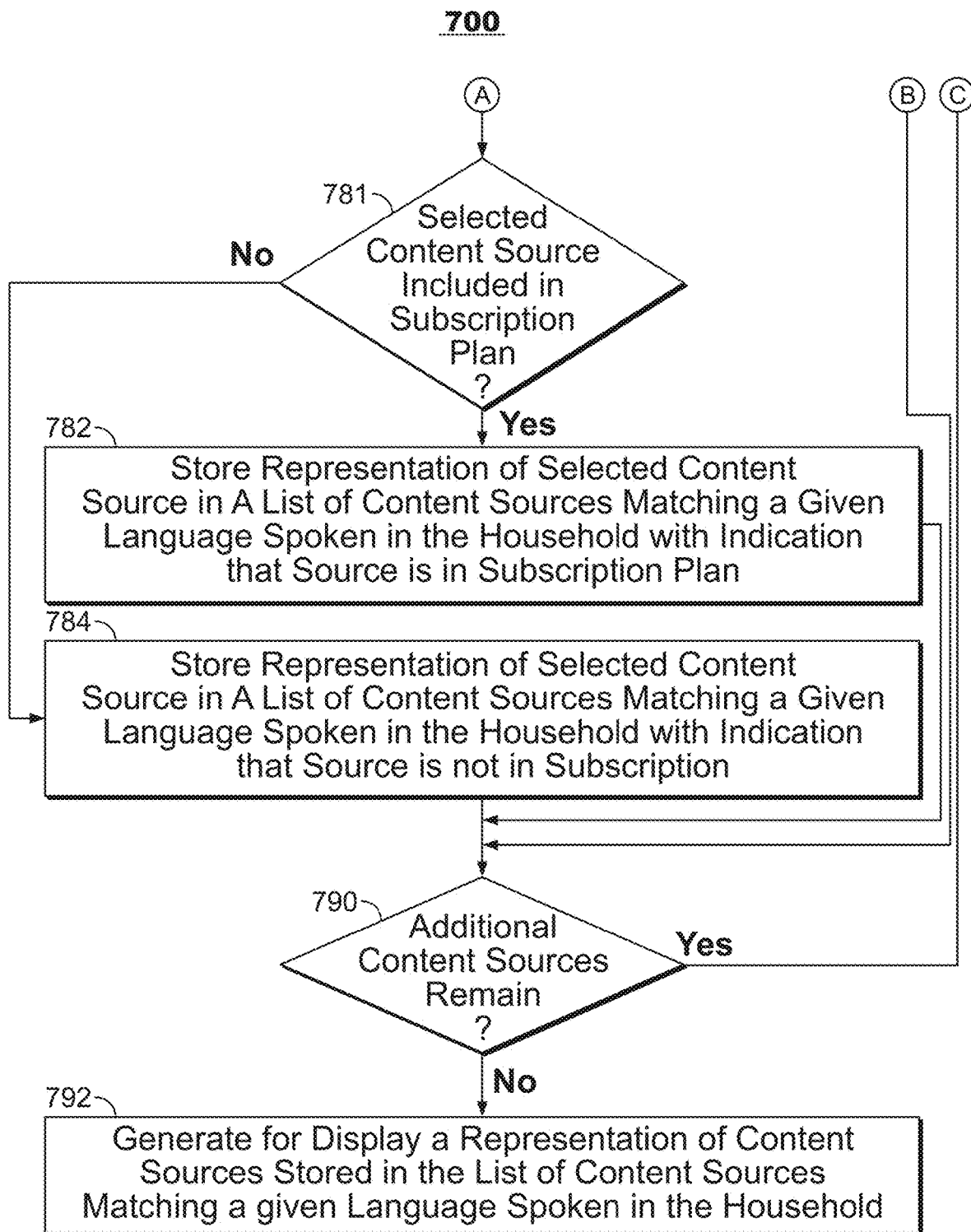

FIGS. 7A and 7B are a flow diagram of an illustrative process 700 for identifying content corresponding to a spoken language in accordance with some embodiments of the disclosure. At step 710, verbal input is received from a user in a household. For example, the media guidance application may monitor continuously or periodically conversations between users to receive the verbal input from the users in the household. The media guidance application may receive a trigger each time the voice recognition engine of control circuitry 304 detects a voice from a user to receive the verbal input.

At step 720, the verbal input is processed to determine a language spoken by the user. For example, the media guidance application may generate phonemes representing the verbal input received from the user and cross-reference the generated phonemes with a phoneme database to determine a language corresponding to the received verbal input. The media guidance application may store the language in a list in storage 308.

At step 730, a value representing how long the determined language was spoken in the household is stored. The media guidance application may measure duration of the verbal input that represents how often that language is spoken in the household. The media guidance application may increment any previously stored duration value for the associated language by the most recently measured duration.

At step 740, a determination is made as to whether additional verbal input was received. In response to determining that additional verbal input was received, the process proceeds to step 720;

otherwise, the process proceeds to step 742.

At step 742, one or more languages spoken in the household are identified. For example, the media guidance application may retrieve from storage 308 a list of all the languages spoken in the household. The media guidance application may automatically identify one of the languages having the largest duration value, which may indicate that the identified language is the most spoken language in the household. Alternatively, the media guidance application may present interactive list 522 of all spoken languages in the household to the user (FIG. 5). The media guidance application may receive a user input selecting one of the languages in list 522 as the identified language.

At step 750, a subscription plan associated with the household is identified. For example, the media guidance application may retrieve from storage 308 a subscription plan of the household or user that includes a list of all the content sources to which the household or user subscribes.

At step 760, associated language field values that identify the language that the associated content source transmits content to a plurality of users are retrieved from a database of a list of content sources.

At step 770, a next content source is selected from the list of content sources. For example, the media guidance application may process each content source stored in the database starting with the first content source.

At step 780, a determination is made as to whether the language field value of the selected content source corresponds to one of the one or more languages spoken in the household. For example, the media guidance application may compare the value of the language field for the selected content source to the identified language and determine whether they correspond to the same language. In response to determining that the language field value of the selected content source corresponds to one of the one or more languages spoken in the household, the process proceeds to step 781; otherwise the process proceeds to step 790.

At step 781, a determination is made as to whether the selected content source is included in the identified subscription plan. In response to determining that the selected content source is included in the identified subscription plan, the process proceeds to step 782; otherwise the process proceeds to step 784.

At step 782, a representation of the selected content source is stored in a list of content sources matching a given language spoken in the household with an indication that the source is included in the identified subscription plan.

At step 784, a representation of the selected content source is stored in a list of content sources matching a given language spoken in the household with an indication that the source is not included in the identified subscription plan.

At step 790, a determination is made as to whether additional content sources remain. In response to determining that additional content sources remain, the process proceeds to step 770; otherwise the process proceeds to step 792.

At step 792, a representation of the content sources stored in the list of content sources matching a given language spoken in the household is generated for display. For example, the media guidance application may select representations of those content sources stored in the list of content sources that are included in the user's or household subscription plan. Alternatively or in addition, the media guidance application may select representations of those content sources stored in the list of content sources that are not included in the user's or household subscription plan (e.g., in order to promote or advertise content sources to which the user or household does not subscribe but that match an identified language spoken in the household). The media guidance application may present overlay 610, which includes a content sources region and program region 620 with the selected representations of content sources (FIG. 6). The media guidance application may receive a user selection of one of the content sources or programs in overlay 610 and access the corresponding source.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. Furthermore, as referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action. In addition, the systems and methods described herein may be performed in real time. It should also be noted, the systems and/or methods described above may be applied to, or used in accordance with, other systems and/or methods.

What is claimed is:

1. A method for identifying content corresponding to a language, the method comprising:
    receiving a plurality of verbal inputs over a time period;
    automatically determining, using voice recognition circuitry, respective languages of the plurality of verbal inputs;
    determining, for each of the respective languages, an aggregate duration of the plurality of verbal inputs received over the time period that correspond to the language;
    generating for display a list of a plurality of the respective languages, wherein the plurality of the respective languages is ordered based on the determined aggregate durations;
    receiving user input identifying a language of the plurality of the respective languages;
    in response to receiving the user input, identifying content in the identified language; and
    generating for display a representation of the identified content.

2. The method of claim 1, further comprising:
    in response to receiving the user input identifying the language:
    searching a database of content sources to identify a content source that transmits the content in the identified language; and
    generating for display a representation of the identified content source.

3. The method of claim 2, wherein the representation of the identified content source includes a channel name or number of the identified content source.

4. The method of claim 2, wherein the representation of the identified content source is included in an overlay on top of content currently being generated for display.

5. The method of claim 2, further comprising:
    retrieving a subscription plan from a storage device;
    determining that the identified content source that transmits language content in the identified language is not included in the retrieved subscription plan prior to generating for display the representation of the identified content source;
    cross-referencing the database of content sources to identify a second content source associated with a language field value that corresponds to the identified language; and
    generating for display a representation of the identified second content source.

6. The method of claim 1, further comprising storing the determined aggregate durations in a memory in association with the languages, respectively.

7. The method of claim 6, further comprising:
    for at least one of the languages, determining an updated aggregate duration of verbal inputs received that correspond to the language; and
    storing the updated aggregate duration in association with the language in the memory by overwriting the aggregate duration stored in association with the language.

8. The method of claim 7, further comprising:
    receiving input selecting a second language of the plurality of the respective languages; and
    in response to receiving the input selecting the second language:
    identifying updated content in the second language; and
    generating for display a representation of the identified updated content.

9. The method of claim 1, wherein generating for display the list of the plurality of respective languages comprises identifying a language spoken most often and placing the language spoken most often at a top of the list.

10. The method of claim 9, wherein identifying the language spoken most often comprises determining a greatest aggregate duration among the determined aggregate durations.

11. A system for identifying content corresponding to a language, the system comprising:
    control circuitry; and
    voice recognition circuitry,
    wherein the control circuitry is configured to receive a plurality of verbal inputs over a time period,
    wherein the voice recognition circuitry is configured to automatically determine respective languages of the plurality of verbal inputs, and
    wherein the control circuitry is further configured to:
    determine, for each of the respective languages, an aggregate duration of the plurality of verbal inputs received over the time period that correspond to the language;
    generate for display a list of a plurality of the respective languages, wherein the plurality of the respective languages is ordered based on the determined aggregate durations;
    receive user input identifying a language of the plurality of the respective languages;
    in response to receiving the user input, identify content in the identified language; and
    generate for display a representation of the identified content.

12. The system of claim 11, wherein the control circuitry is further configured to:
    in response to receiving the user input identifying the language:
    search a database of content sources to identify a content source that transmits content in the identified language, and generate for display a representation of the identified content source.

13. The system of claim 12, wherein the representation of the identified content source includes a channel name or number of the identified content source.

14. The system of claim 12, wherein the representation of the identified content source is included in an overlay on top of content currently being generated for display.

15. The system of claim 12, further comprising storage circuitry, wherein the control circuitry is further configured to:
retrieve a subscription plan from the storage circuitry;
determine that the identified content source that transmits language content in the identified language is not included in the retrieved subscription plan prior to generating for display the representation of the identified content source;
cross-reference the database of content sources to identify a second content source associated with a language field value that corresponds to the identified language; and generate for display a representation of the identified second content source.

16. The system of claim 11, further comprising storage circuitry,
wherein the storage circuitry is configured to store the determined aggregate durations in association with the languages, respectively.

17. The system of claim 16, wherein the control circuitry is further configured to, for at least one of the languages, determine an updated aggregate duration of verbal inputs received that correspond to the language, and
wherein the storage circuitry is further configured to store the updated aggregate duration in association with the language by overwriting the aggregate duration stored in association with the language.

18. The system of claim 17, wherein the control circuitry is further configured to:
receive input selecting a second language of the plurality of the respective languages; and
in response to receiving the input selecting the second language:
identify updated content in the second language; and
generate for display a representation of the identified updated content.

19. The system of claim 11, wherein the control circuitry is further configured to generate for display the list of the plurality of respective languages comprises identifying a language spoken most often and placing the language spoken most often at a top of the list.

20. The system of claim 19, wherein the control circuitry is further configured to identify the language spoken most often by determining a greatest aggregate duration among the determined aggregate durations.

* * * * *